United States Patent
Teng et al.

(10) Patent No.: US 12,521,813 B2
(45) Date of Patent: Jan. 13, 2026

(54) RESISTANCE WELDING METHODS, ASSEMBLIES, AND VEHICLES

(71) Applicant: GM GLOBAL TECHNOLOGY OPERATIONS LLC, Detroit, MI (US)

(72) Inventors: Zhenke Teng, Troy, MI (US); Tingting Zhang, Troy, MI (US); Andrew C. Bobel, Troy, MI (US); Jason M Brown, Goodrich, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 911 days.

(21) Appl. No.: 17/663,928

(22) Filed: May 18, 2022

(65) Prior Publication Data

US 2023/0373024 A1    Nov. 23, 2023

(51) Int. Cl.
| | |
|---|---|
| *B23K 11/18* | (2006.01) |
| *B23K 11/11* | (2006.01) |
| *B23K 11/16* | (2006.01) |
| *B23K 101/00* | (2006.01) |
| *B23K 103/10* | (2006.01) |

(52) U.S. Cl.
CPC .......... *B23K 11/185* (2013.01); *B23K 11/115* (2013.01); *B23K 11/163* (2013.01); *B23K 2101/006* (2018.08); *B23K 2103/10* (2018.08)

(58) Field of Classification Search
CPC ... B23K 11/115; B23K 11/163; B23K 11/185; B23K 11/34; B23K 2101/006; B23K 2101/34; B23K 2103/10
USPC ........................................................ 219/91.2
See application file for complete search history.

(56) References Cited

U.S. PATENT DOCUMENTS

| | | | |
|---|---|---|---|
| 5,599,467 A | 2/1997 | Okabe et al. | |
| 2014/0360986 A1* | 12/2014 | Sigler | B23K 11/34 |
| | | | 219/91.2 |
| 2017/0297134 A1* | 10/2017 | Sigler | B23K 35/002 |
| 2021/0387291 A1* | 12/2021 | Anderson | B23K 35/0227 |

FOREIGN PATENT DOCUMENTS

| | | |
|---|---|---|
| DE | 102010013894 A1 | 11/2010 |
| JP | 06007953 A | 1/1994 |

* cited by examiner

*Primary Examiner* — Ibrahime A Abraham
*Assistant Examiner* — Joseph W Iskra
(74) *Attorney, Agent, or Firm* — Ingrassia Fisher & Lorenz, LLP | IF&L

(57) ABSTRACT

Methods for resistance welding, resistance-welded assemblies, and vehicles including resistance-welded assemblies are provided. The method includes providing a workpiece stack-up including first and second workpieces and an intermediate material located between the faying surfaces thereof. At least one of the first workpiece and the second workpiece is formed of a first metal alloy with a first concentration of an alloying element, and the intermediate material is formed of a second metal alloy of the first metal and a second concentration of the alloying element that is less than the first concentration. The method includes bringing electrodes into contact with the workpieces, passing an electrical current therebetween to form a molten weld pool, and cooling the molten weld pool into a weld nugget that forms all or part of a weld joint between the workpieces and has a composition that is a mixture of the workpieces and the intermediate material.

13 Claims, 9 Drawing Sheets

RESISTANCE WELDING METHODS, ASSEMBLIES, AND VEHICLES

INTRODUCTION

The technical field of this disclosure relates generally to resistance welding and, more particularly, to resistance spot-welding or resistance seam-welding of a metal or metal alloy workpiece.

Resistance welding (e.g., resistance spot-welding and resistance seam-welding) is a process used in various industries to join two or more metal workpieces. The automotive industry, for instance, often uses resistance welding to join metal workpieces during the manufacture of a vehicle door, hood, trunk lid, or lift gate, among other vehicle components. Multiple welds are typically made along a periphery of the metal workpieces or at some other location.

Resistance welding, in general, relies on the resistance to the flow of electric current through contacting metal workpieces and across their faying interface to generate heat. To carry out a resistance welding process, a pair of opposed welding electrodes is clamped at aligned spots on opposite sides of the metal workpieces at a weld site. An electrical current is then passed through the workpieces from one welding electrode to the other. Resistance to the flow of the electric current generates heat within the metal workpieces and at their faying interface. For workpieces formed of certain metals and alloys (e.g., aluminum and aluminum alloys) the heat generated at the faying interface typically initiates a molten weld pool that penetrates the aluminum workpieces from the faying interface. Upon cessation of the current flow, the molten weld pool solidifies into a weld nugget that forms all or part of a weld joint. After the resistance welding process is completed, the welding electrodes are retracted from the workpiece surfaces and the resistance welding process may be repeated at another weld site.

Ultra-high strength aluminum alloys (e.g., 7000 series; wrought alloys), such as 7075 aluminum alloy (AA7075; e.g., about 90.0 wt. % Al, 5.6 wt. % Zn, 2.5 wt. % Mg, 1.6 wt. % Cu, 0.23 wt. % Cr), have significant potential for use in applications that desire high strength and low weight components, such as components in vehicles. The strength of these alloys typically results from precipitation hardening or age hardening processes in which the alloys undergo solid-solution treatment (i.e., heating above a solvus temperature), quenching (i.e., rapid cooling to below the solvus temperature), and then aging (i.e., heat treatment to form/grow precipitates) to form coherent precipitates (i.e., precipitates that are a continuation of the lattice structure of the alloy and has no phase or grain boundary) that provide a substantial strengthening effect by impeding dislocation movement in the alloys.

However, ultra-high strength aluminum alloys have not been widely used, to date, in the automotive industry due at least in part to challenges relating to poor mechanical properties resulting from resistance welding. Specifically, resistance welding of ultra-high strength aluminum alloys causes the local strengthening precipitates to completely dissolve yielding a weld pool with relatively high concentrations of alloying elements. Subsequent solidification of the weld pools typically results in the formation of precipitate rich phases having brittle intermetallic compounds therein which may cause the resulting weld nuggets to comprise cracks and/or significant porosity. As such, weld nuggets formed from ultra-high strength aluminum alloys often have a significantly reduced cross-tension strength relative to the workpieces.

Accordingly, it is desirable to provide a method for resistance welding precipitation strengthened alloys, such as certain aluminum alloys, capable of forming weld nuggets with improved material properties such as improved cross-tension strength. Furthermore, other desirable features and characteristics of the present invention will become apparent from the subsequent detailed description and the appended claims, taken in conjunction with the accompanying drawings and the foregoing technical field and background.

SUMMARY

Methods for resistance welding, resistance-welded assemblies, and vehicles including resistance-welded assemblies are provided.

A method is provided for resistance welding that includes providing a workpiece stack-up including a first workpiece having a first faying surface, a second workpiece having a second faying surface, and an intermediate material located between and in contact with the first faying surface and the second faying surface. At least one of the first workpiece and the second workpiece is formed of a first alloy with a composition comprising at least 10 wt. % of a first metal and a first concentration of at least one alloying element. The intermediate material is formed of a second alloy having a composition comprising at least 10 wt. % of the first metal and a second concentration of the at least one alloying element. The second concentration is less than the first concentration. The method includes bringing a first welding electrode into contact with the first workpiece and bringing a second welding electrode into contact with the second workpiece, passing an electrical current between the first welding electrode and the second welding electrode to form a molten weld pool within the first workpiece, the second workpiece, and the intermediate material, and cooling the molten weld pool into a weld nugget that forms all or part of a weld joint between the first workpiece and the second workpiece. The weld nugget has a composition that is a mixture of compositions of the first workpiece, the second workpiece, and the intermediate material.

In certain embodiments, the compositions of the first alloy and the second alloy each comprise at least 90 wt. % of the first metal. In certain embodiments, the second concentration is at least 50 percent lower than the first concentration.

In certain embodiments, the weld nugget has a volume fraction of precipitate rich phases that is lower than a volume fraction of a comparative weld nugget that has a composition that is a mixture of only the first workpiece and the second workpiece. In certain embodiments, the weld nugget has a volume fraction of precipitate rich phases of less than about 20 vol. %.

In certain embodiments, the intermediate material has a melting temperature that is equal to or less than melting temperatures of the first workpiece and the second workpiece. In certain embodiments, at least one of the first workpiece and the second workpiece is formed of a precipitation hardened aluminum alloy and the intermediate material has a melting temperature of 600° C. or less.

In certain embodiments, the first workpiece and the second workpiece are each formed of a 2000, 6000, or 7000 series aluminum alloy. In certain embodiments, the first workpiece and the second workpiece are each formed of 7075 series aluminum alloy and the intermediate material has a composition that includes at least about 97.0 wt. % Al, equal to or less than 0.25 wt. % Zn, between about 0.45 and 0.7 wt. % Mg, between about 0.8 and 1.5 wt. % Si, and between about 0.01 and 0.11 wt. % Cu.

In certain embodiments, the intermediate material is a sheet or shim that is physically separate from, and in contact with, the first workpiece and the second workpiece prior to passing an electrical current between the first welding electrode and the second welding electrode. In certain embodiments, the intermediate material is a layer on the first workpiece or on the second workpiece deposited with a thermal spray process, an additive manufacturing process, or an arc braze process.

A resistance-welded metal assembly is provided. In one embodiment, the resistance-welded metal assembly includes a first workpiece, a second workpiece, and a weld nugget that forms all or part of a weld joint between the first workpiece and the second workpiece. The weld nugget has a composition that is a mixture of compositions of the first workpiece, the second workpiece, and an intermediate material. At least one of the first workpiece and the second workpiece is formed of a first alloy with a composition comprising at least 10 wt. % of a first metal and a first concentration of at least one alloying element. The intermediate material is formed of a second alloy having a composition comprising at least 10 wt. % of the first metal and a second concentration of the at least one alloying element. The second concentration is less than the first concentration.

In certain embodiments, the second concentration is at least 50 percent lower than the first concentration of the at least one alloying element in the intermediate material of the resistance-welded metal assembly.

In certain embodiments, the first workpiece and the second workpiece of the resistance-welded metal assembly are each formed of a 2000, 6000, or 7000 series aluminum alloy. In certain embodiments, the first workpiece and the second workpiece are each formed of 7075 series aluminum alloy and the intermediate material has a composition that includes at least about 97.0 wt. % Al, equal to or less than 0.25 wt. % Zn, between about 0.45 and 0.7 wt. % Mg, between about 0.8 and 1.5 wt. % Si, and between about 0.01 and 0.11 wt. % Cu.

A vehicle is provided. In one embodiment, the vehicle includes a resistance-welded metal assembly having a first workpiece, a second workpiece, and a weld nugget that forms all or part of a weld joint between the first workpiece and the second workpiece. The weld nugget has a composition that is a mixture of compositions of the first workpiece, the second workpiece, and an intermediate material. At least one of the first workpiece and the second workpiece is formed of a first alloy with a composition comprising at least 10 wt. % of a first metal and a first concentration of at least one alloying element. The intermediate material is formed of a second alloy having a composition comprising at least 10 wt. % of the first metal and a second concentration of the at least one alloying element. The second concentration is less than the first concentration.

In certain embodiments, the second concentration is at least 50 percent lower than the first concentration of the at least one alloying element of the resistance-welded metal assembly of the vehicle.

In certain embodiments, the first workpiece and the second workpiece of the resistance-welded metal assembly of the vehicle are each formed of a 2000, 6000, or 7000 series aluminum alloy. In certain embodiments, the first workpiece and the second workpiece are each formed of 7075 series aluminum alloy and the intermediate material has a composition that includes at least about 97.0 wt. % Al, equal to or less than 0.25 wt. % Zn, between about 0.45 and 0.7 wt. % Mg, between about 0.8 and 1.5 wt. % Si, and between about 0.01 and 0.11 wt. % Cu.

In certain embodiments, the resistance-welded metal assembly is a structural component of the vehicle.

BRIEF DESCRIPTION OF THE DRAWINGS

The exemplary embodiments will hereinafter be described in conjunction with the following drawing figures, wherein like numerals denote like elements, and wherein.

DETAILED DESCRIPTION

Figure 1:
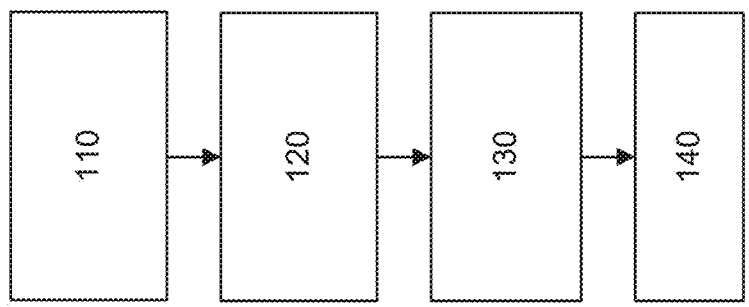
FIG. 1 is a flow chart illustrating a method for resistance welding workpieces in accordance with an embodiment.

The following detailed description is merely exemplary in nature and is not intended to limit the application and uses. Furthermore, there is no intention to be bound by any expressed or implied theory presented in the preceding technical field, background, brief summary or the following detailed description.

As used herein, the word "exemplary" means "serving as an example, instance, or illustration". As used herein, "a," "an," or "the" means one or more unless otherwise specified. The term "or" can be conjunctive or disjunctive. Open terms such as "include," "including," "contain," "containing" and the like mean "comprising", but in certain embodiments may mean "consisting of". In certain embodiments, numbers in this description indicating amounts, ratios of materials, physical properties of materials, and/or use may be understood as being modified by the word "about". The term "about" as used in connection with a numerical value and the claims denotes an interval of accuracy, familiar and acceptable to a person skilled in the art. In general, such interval of accuracy is ±10%. All numbers in this description indicating amounts, ratios of materials, physical properties of materials, and/or use may be understood as modified by the word "about," except as otherwise explicitly indicated.

The figures are in simplified schematic form and are not to precise scale. Further, terms such as "upper", "lower", "above," "over," "below," "under," "upward," "downward," et cetera, are used descriptively of the figures, and do not represent limitations on the scope of the subject matter, as defined by the appended claims. Any numerical designations, such as "first" or "second" are illustrative only and are not intended to limit the scope of the subject matter in any way. It is noted that while embodiments may be described herein with respect to automotive applications, those skilled in the art will recognize their broader applicability.

Embodiments herein are related to resistance welding, such as to resistance spot-welding and resistance seam-welding of metal or metal alloy components. While specific embodiments are described herein including aluminum or aluminum alloy workpieces, such descriptions are not limiting. Workpieces of other metals or metal alloys are contemplated. In particular, various precipitation hardened workpieces are contemplated. As used herein a "metal" workpiece or a workpiece comprised of the "metal or metal alloy", refers to such workpieces that are at least 10 wt. % of the named metal. In certain embodiments, such workpieces are at least 25 wt. %, such as at least 50 wt. %, for example at least 75 wt. %, such as at least 80 wt. %, for example at least 95 wt. % of the named metal. Elements of a metal alloy other than the named metal are referred to herein as alloying elements.

Embodiments herein provide for resistance welding of workpieces to form weld nuggets defining weld joints therebetween. The embodiments can reduce the formation of precipitate rich phases within the weld nuggets which lower the cross-tension strength of the resulting weld joints. As used herein, the phrase "precipitate rich phases" refers to any phase having a majority of certain brittle intermetallic compounds relative to metal alloys (i.e., more than 50 wt. %) that contribute to cracking and/or porosity in the weld joint. As used herein, the phrase "intermetallic compounds" refers to solid phases containing two or more metallic elements, with optionally one or more non-metallic elements, whose crystal structure differs from that of the other constituents (e.g., adjacent metal alloys).

In certain examples, an intermediate material is provided between faying surfaces of the workpieces to reduce solidification cracking and porosity in a resulting weld nugget. Specifically, the intermediate material may have a composition suitable such that, during the welding process, the intermediate material melts into the weld pool thereby adding material to the weld pool and the weld nugget formed therefrom. As such, the resulting weld nugget has a composition that is a combination of the compositions of the workpieces and the intermediate material. Such compositions may have reduced concentrations of alloying elements and/or may otherwise reduce the formation of precipitate rich phases relative to weld nuggets formed from the workpieces alone without the presence of the intermediate material.

Referring now to FIGS. 1-4, a method 100 is described herein for resistance welding workpieces to yield resistance-welded assemblies with weld nuggets having improved cross-tension strength.

Figure 2:
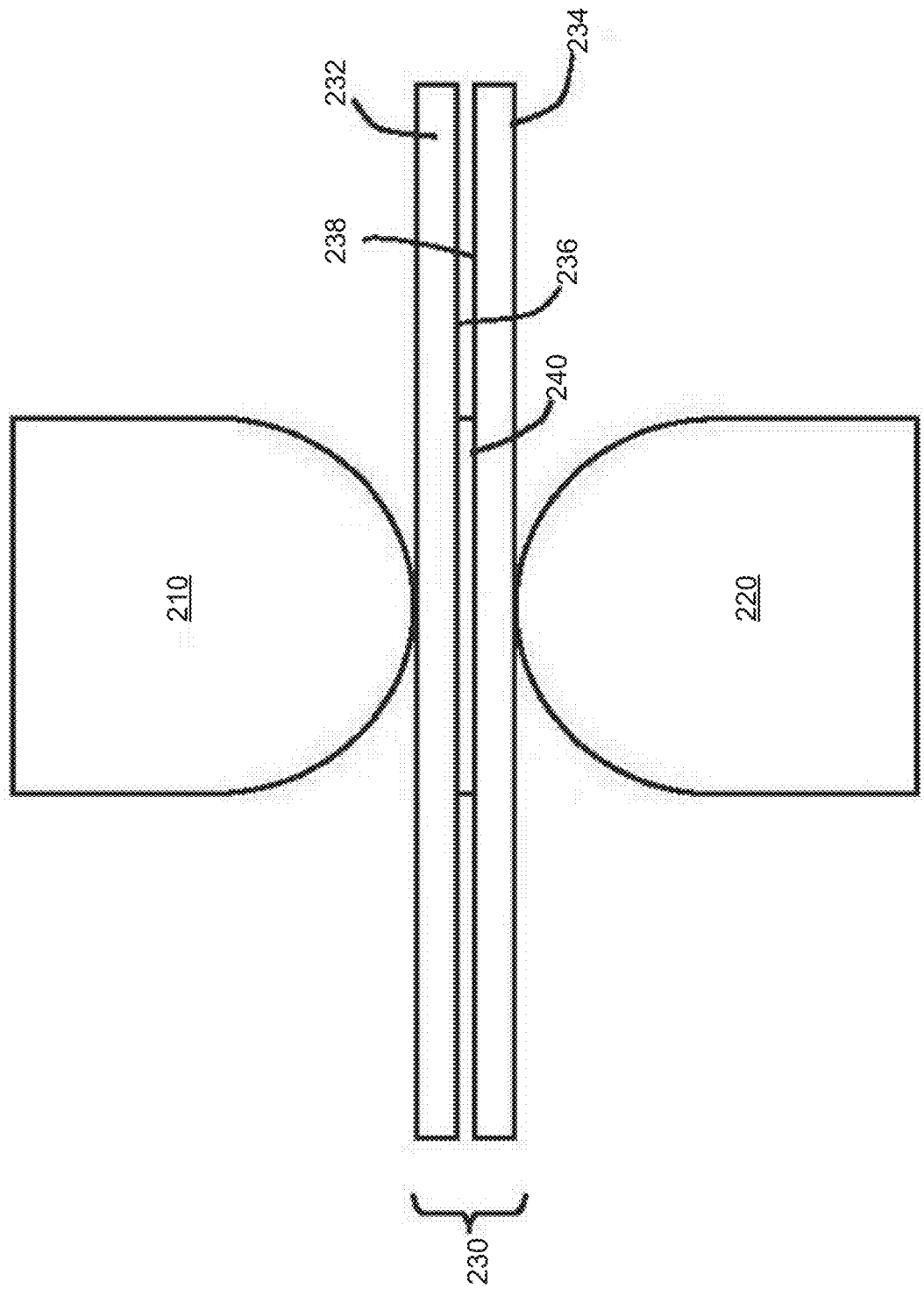
FIG. 2 is a schematic of an initial stage in a method for resistance welding workpieces in accordance with an embodiment.

In step 110, the method includes providing a workpiece stack-up that includes a pair of workpieces with an intermediate material therebetween. In step 120, welding electrodes are provided and placed in contact with the workpieces on opposite sides of the workpiece stack-up. For example, FIG. 2 shows two opposed welding electrodes 210 and 220 (also referred as the first welding electrode 210 and the second welding electrode 220) in contact with a workpiece stack-up 230. Each welding electrode 210 and 220 has a domed or dome-shaped end. It is noted that welding electrodes 210 and 220 may not be identical. Further, it is noted that either or both of welding electrodes 210 and 220 may not have a domed end, such that other geometries are contemplated for welding electrodes 210 and 220.

The exemplary workpiece stack-up 230 includes a first workpiece 232 having a first faying surface 236, a second workpiece 234 having a second faying surface 238, and an intermediate material 240 between the first workpiece 232 and the second workpiece 234 and having faces thereof in contact with the first and second faying surfaces 236 and 238. Exemplary workpieces 232 and 234 are metal or metal alloys, such as aluminum, aluminum alloy, magnesium, magnesium alloys, or other suitable metals. For example, workpieces 232 and 234 may be 2000, 6000, or 7000 series cast or extruded aluminum alloys suitable for automotive use. As a specific example, the workpieces 232 and 234 may be 7075 aluminum alloys having compositions of about 5.1 to 6.1 wt. % Zn, about 2.1 to 2.9 wt. % Mg, less than about 0.4 wt. % Si, about 1.2 to 2.0 wt. % Cu, less than about 0.5 wt. % Fe, less than about 0.3 wt. % Mn, about 0.18 to 0.28 wt. % Cr, with the balance being aluminum.

In certain examples, each workpiece 232 and 234 has a thickness of less than 6 mm, such as less than 4 mm, for example less than 2 mm, or less than 1 mm, and a thickness greater than 0.1 mm, such as greater than 0.4 mm, or greater than 1 mm. In some examples, each workpiece 232 and 234 has a thickness of between about 0.4 mm and 6 mm.

The intermediate material 240 is located between and in contact with the first and second faying surfaces 236 and 238 of the workpieces 232 and 234. As shown, the intermediate material 240 has an initial thickness. Exemplary intermediate materials 240 have an initial thickness of great than 0.025 mm, great than 0.05 mm, or great than 0.1 mm and less than 5 mm, less than 2 mm, or less than 1 mm.

The intermediate material 240 may have various forms or structures. In certain examples, the intermediate material 240 may be a sheet or a shim that is physically separate from, and in contact with, the first workpiece 232 and the second workpiece 234 in the workpiece stack-up 230. In other examples, the intermediate material 240 may be a coating or layer deposited on the first workpiece 232 and/or the second workpiece 234 via various deposition processes.

An exemplary intermediate material 240 is a layer on the first workpiece 232 or the second workpiece 234 deposited with a thermal spray process. Another exemplary intermediate material 240 is a layer on the first workpiece 232 or the second workpiece 234 deposited with an additive manufacturing process. Yet another exemplary intermediate material 240 is a layer on the first workpiece 232 or the second workpiece 234 deposited with an arc braze process.

Exemplary intermediate materials 240 are metal or metal alloys, such as aluminum, aluminum alloy, magnesium, magnesium alloys, or other suitable metals. For example, workpieces 232 and 234 may be a 2000, 6000, or 7000 series cast or extruded aluminum alloy.

An exemplary intermediate material 240 is an aluminum alloy having a composition of between about 4.0 to about 11.0 wt. % Zn, about 1.0 to about 3.3 wt. % Mg, up to about 2.3 wt. % Cu, and up to about 1.5 wt. % Si, with the remainder being substantially aluminum.

An exemplary intermediate material 240 is an aluminum alloy having a composition of less than 5.6 wt. % Zn, less than about 2.5 wt. % Mg, less than about 1.6 wt. % Cu, with the remainder being substantially aluminum.

An exemplary intermediate material 240 is an aluminum alloy having a composition of less than about 0.25 wt. % Zn, about 0.45 to 0.7 wt. % Mg, about 0.8 to 1.5 wt. % Si, about 0.01 to 0.11 wt. % Cu, about 0.05 to 0.2 wt. % Fe, about 0.02 to 0.1 wt. % Mn, less than about 0.1 wt. % Cr, with the balance being aluminum.

An exemplary intermediate material 240 is an aluminum alloy having a composition of less than about 0.25 wt. % Zn, about 0.45 to 0.7 wt. % Mg, about 0.8 to 1.5 wt. % Si, about 0.01 to 0.11 wt. % Cu, with the remainder being substantially aluminum (e.g., at least about 97.0 wt. % Al).

An exemplary intermediate material 240 is a metal alloy comprising the same named metal as one or both of the workpieces 232 and 234 and includes a reduced concentration of one or more alloying elements present in one or both of the workpieces 232 and 234. For example, one or both of the workpieces 232 and 234 may be a first metal alloy comprising one or more alloying elements and the intermediate material 240 may be a second metal alloy comprising the same named metal as the first metal alloy with a reduced concentration of one or more of the alloying element(s) of the first metal alloy, such as a 10 percent reduction of one or more of the alloying element(s), a 25 percent reduction of one or more of the alloying element(s), a 50 percent reduction of one or more of the alloying element(s), a 75 percent reduction of one or more of the alloying element(s), a 90 percent reduction of one or more of the alloying element(s), or a 95 percent reduction of one or more of the alloying element(s). For example, the workpieces 232 and 234 may be aluminum alloys having a composition that includes 2.9 wt. % Mg (optionally among other alloying elements) and the intermediate material 240 may be an aluminum alloy having a composition that includes less than 2.9 wt. % Mg, such as 2.61 wt. % Mg (10% reduction), 2.175 wt. % Mg (25% reduction), 1.45 wt. % Mg (50% reduction), 0.725 wt. % Mg (75% reduction), 0.29 wt. % Mg (90% reduction), or 0.145 wt. % Mg (95% reduction). In certain examples, the alloying element that is reduced in concentration in the intermediate material 240 relative to one or both of the workpieces 232 and 234 may be zinc, magnesium, or copper. In certain examples, the intermediate material 240 may have an increased concentration of silicon relative to the workpieces 232 and/or 234, such as a 100 percent increase, a 200 percent increase, or a 300 percent increase. As used herein, the phrase "reduced concentration" of an alloying element includes omission of the alloying element, that is, 0 wt. %.

The intermediate material 240 may be selected based on its melting point (or decomposition temperature) in view of the type of metal or metal alloy workpieces being resistance welded. For example, the intermediate material 240 may have a melting temperature that is equal to or less than melting temperatures of the first workpiece 232 and the second workpiece 234, such as at least 10 degrees C. less than the melting temperatures of the first workpiece 232 and the second workpiece 234, at least 20 degrees C. less than the melting temperatures of the first workpiece 232 and the second workpiece 234, or 30 degrees C. or more less than the melting temperatures of the first workpiece 232 and the second workpiece 234. An exemplary intermediate material 240 has a melting point (or decomposition temperature) of 660° C. or less, such as for use with aluminum or aluminum alloy workpieces.

Figure 3:
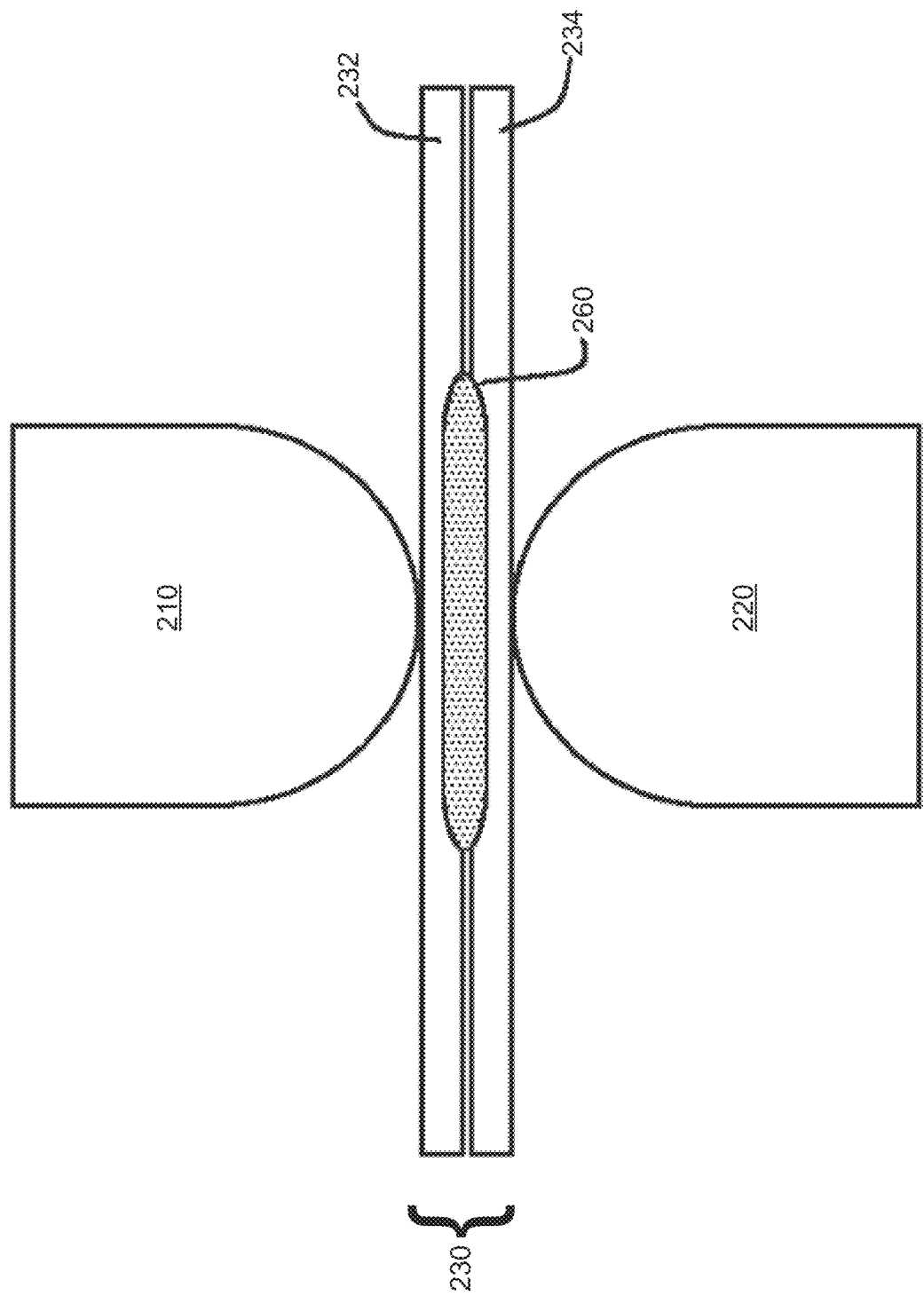
FIG. 3 is a schematic of a melting stage in a method for resistance welding workpieces in accordance with an embodiment.

In step 130, the method 100 continues with passing an electrical current between the welding electrodes and through the workpiece stack-up to form a molten weld pool therein. For example, FIG. 3 shows a molten weld pool 260 is formed within the first workpiece 232, the second workpiece 234, and the intermediate material 240 due to heating caused by resistance to the applied electrical current.

Figure 4:
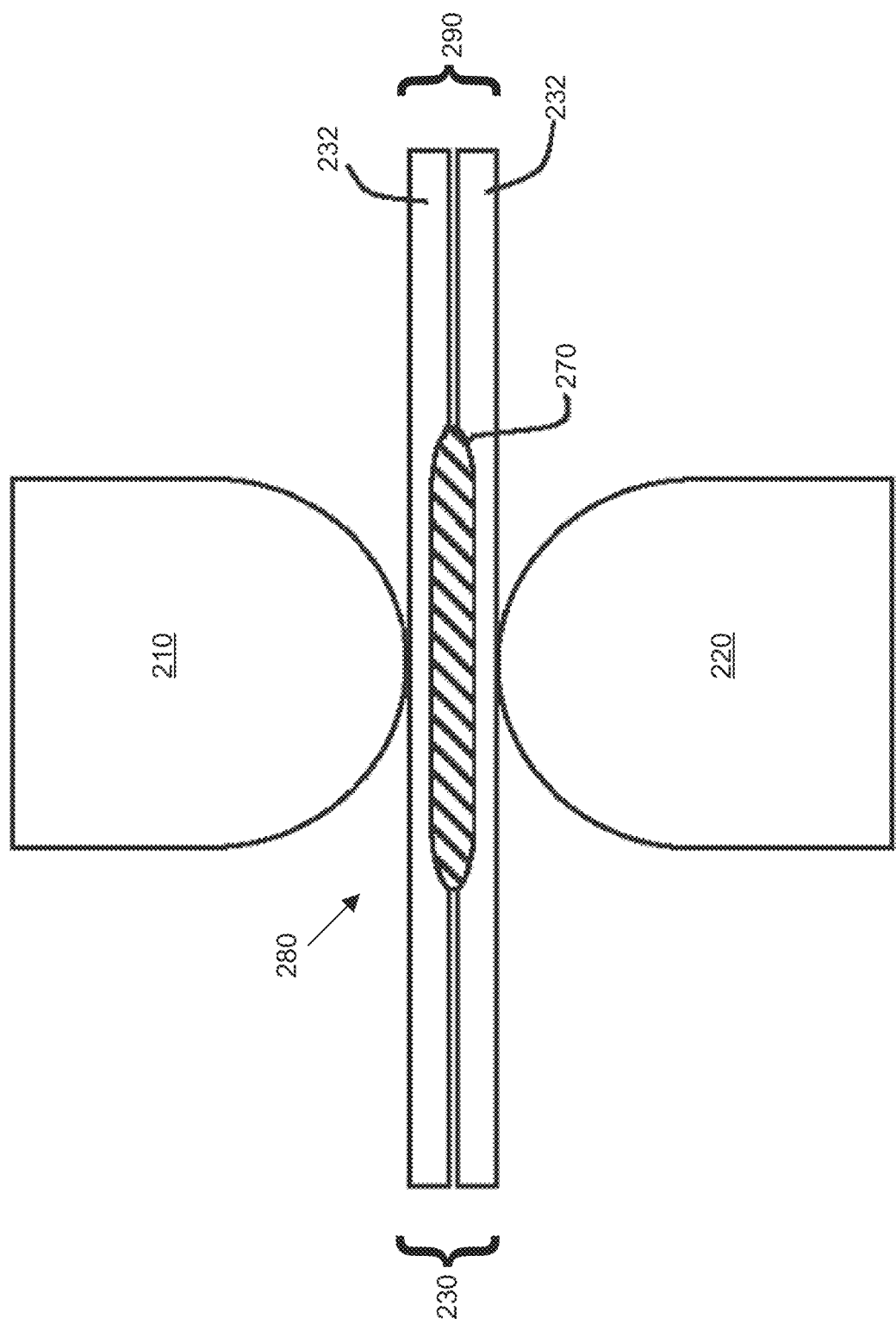
FIG. 4 is a schematic of a cooling stage in a method for resistance welding workpieces in accordance with an embodiment.

In step 140, the method 100 continues with ceasing the passing of the electrical current between the electrodes to allow the molten weld pool to cool (at a rate of change of temperature and a duration of time) to solidify into a weld nugget that forms all or part of a weld joint between the workpieces. For example, FIG. 4 shows the molten weld pool 260 cooled and solidified into a weld nugget 270 that forms all or part of a weld joint 280 between the first workpiece 232 and the second workpiece 234.

As a result, a resistance-welded assembly is formed by the method 100. In FIG. 4, a resulting resistance-welded assembly 290 includes the first workpiece 232 comprised of a metal or metal alloy, the second workpiece 234 comprised of a same or different metal or metal alloy, the weld nugget 270 formed from a combination of the first workpiece 232, the second workpiece 234, and the intermediate material 240. In the resistance-welded assembly 290, the weld nugget 270 forms all or part of the weld joint 280 between the first workpiece 232 and the second workpiece 234.

In certain examples, the weld nugget 270 has a volume fraction of precipitate rich phases that is lower than a comparable weld nugget having a composition comprising a mixture of only the first workpiece 232 and the second workpiece 234 that was solidified from a weld pool under the same or substantially similar conditions (e.g., rate of change of temperature, duration of time, workpiece composition). For example, the volume fraction of precipitate rich phases of the weld nugget 270 may be at least 10 percent less than the comparable weld nugget, such as 20 percent less, 30 percent less, 40 percent less, or 50 percent less. As another example, the volume fraction of the precipitate rich phases of the weld nugget 270 may be less than about 20 vol. %, less than 15 vol. %, less than 10 vol. %, or less than 5 vol. %.

An exemplary weld nugget 270 may include a mass fraction of the intermediate material 240 of greater than about 5 percent, such as greater than 10 percent, greater than 20 percent, greater than 30 percent, greater than 40 percent, greater than 50 percent, greater than 60 percent, greater than 70 percent, greater than 80 percent, or greater than 90 percent.

Figure 9:
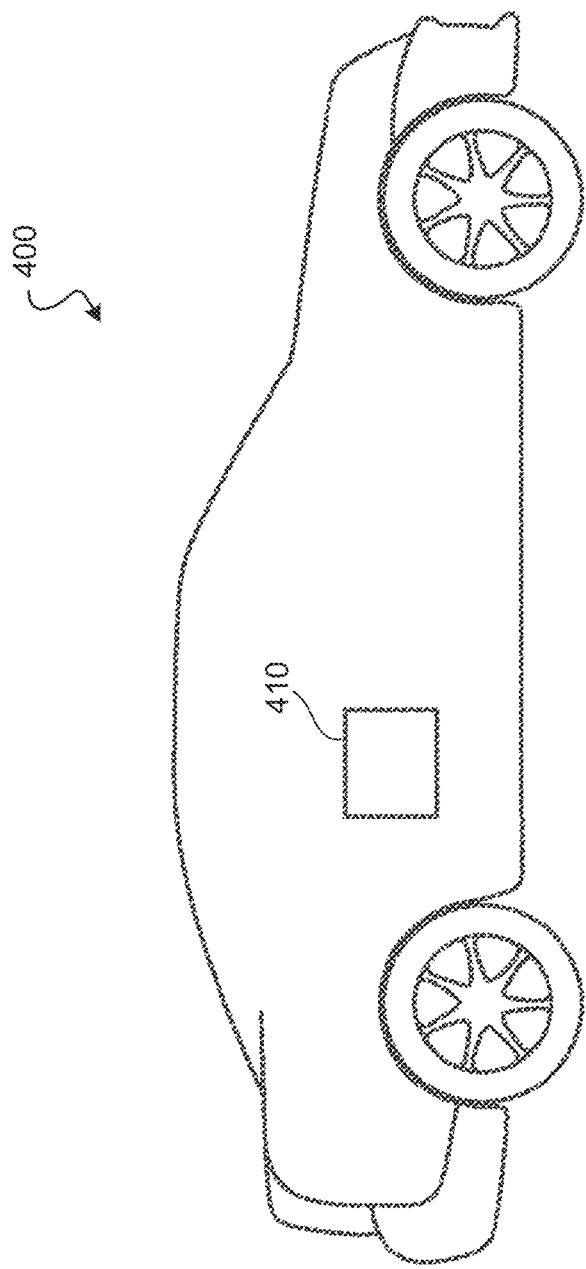
FIG. 9 presents a side view of a vehicle that includes a resistance-welded assembly in accordance with an embodiment.

As disclosed herein, the resistance-welded assembly 290 may form an automotive vehicle component, such as a vehicle door, hood, trunk lid, lift gate, or other body part. In some examples, the vehicle component is a structural component. Therefore, in an embodiment herein a vehicle is provided and includes the resistance-welded metal assembly comprising: the first workpiece 232 comprised of a metal or metal alloy, the second workpiece 234 comprised of a same or different metal or metal alloy, and the weld nugget 270 that forms all or part of the weld joint 280 between the first workpiece 232 and the second workpiece 234, wherein the weld nugget 270 has a composition that is a mixture of compositions of the first workpiece 232, the second workpiece 234, and the intermediate material 240. FIG. 9 schematically represents a vehicle 400 that includes a component 410 that is a resistance-welded assembly fabricated in accordance with the method 100.

As described, the method 100 provides for improving the mechanical and/or material properties of a weld nugget 270 joining the workpieces 232 and 234 by providing a physically separate intermediate material 240 between the workpieces 232 and 234 or by depositing a layer of the intermediate material 240 on the faying surfaces 236 and 238 of one or both of the workpieces 232 and 234 prior to resistance welding. Specifically, the presence of the intermediate material 240 between the workpieces 232 and 234 allows for the reduction of formation of precipitate rich phases during the solidification phase, by contributing to the weld pool 260 and thereby reducing the concentration of alloying elements within the weld pool 260. In other words, the presence of the intermediate material 240 dilutes the weld pool 260 which would otherwise be rich in alloying elements.

Figure 5:
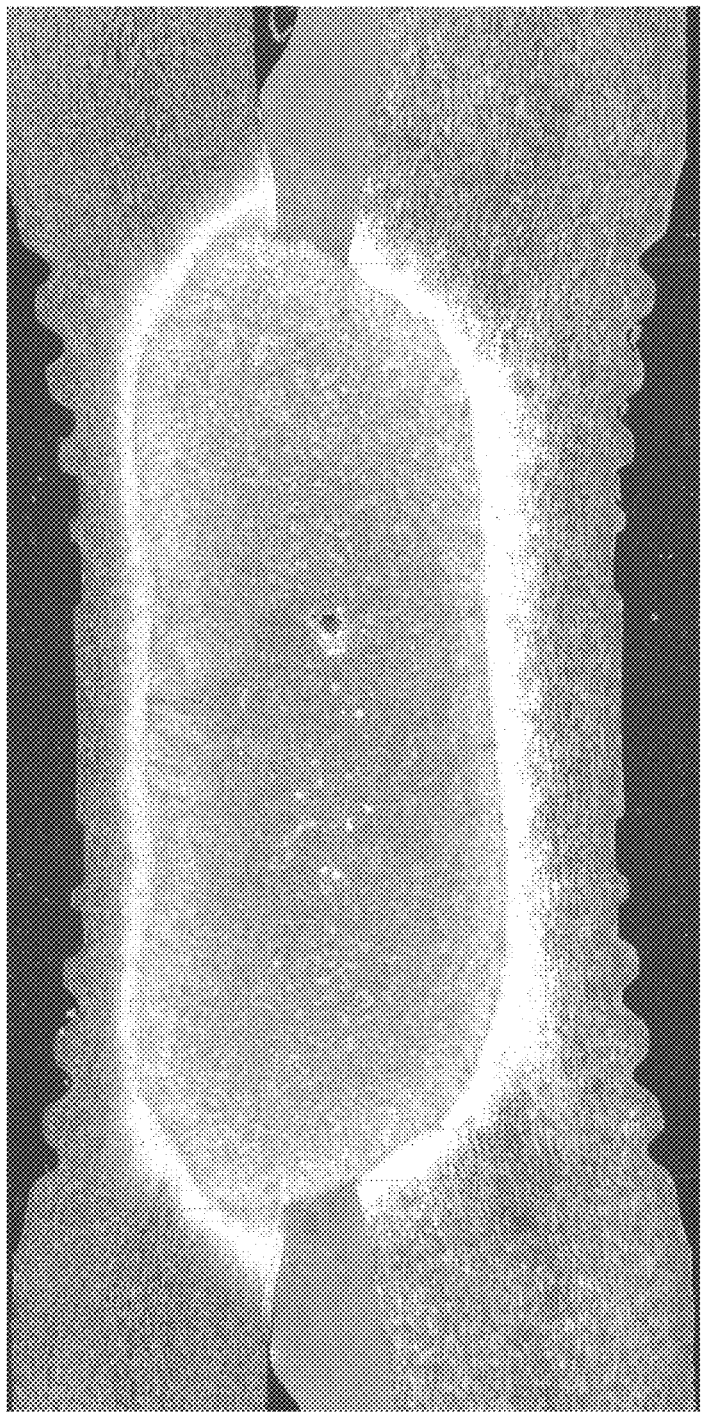
FIG. 5 is a cross-sectional view of a weld nugget formed by resistance welding a workpiece stack-up that included a pair of 7075 aluminum alloy workpieces with an intermediate material therebetween.

FIG. 5 presents a cross-sectional view of an exemplary weld nugget formed from a workpiece stack-up that included a pair of 7075 aluminum alloy workpieces with an intermediate material therebetween formed of an aluminum alloy comprising about 0.1 wt. % Zn, about 0.5 wt. % Mg, about 0.2 wt. % Cu, and about 1.2 wt. % Si, with the remainder being substantially Al. As shown, the weld nugget included little to no cracking or porosity. Analysis of various weld nuggets having similar compositions indicated an increase in cross-tension strength of greater than 100 percent relative to weld nuggets formed from 7075 aluminum alloy workpieces alone without the presence of the intermediate material, with increases in cross-tension strength as high as about 170 percent. As discussed previously, these significant improvements in cross-tension strength are attributed to a reduction in precipitate rich phases formed during solidification.

Figure 6:
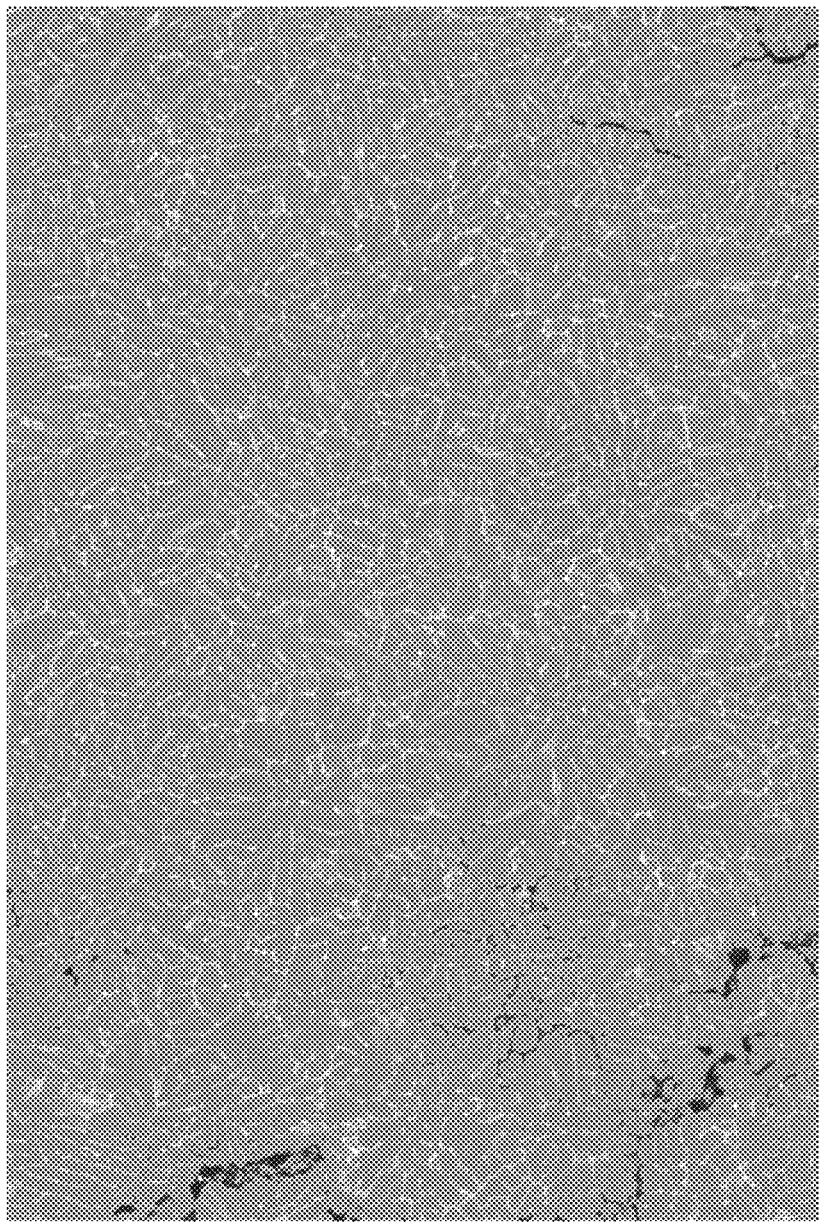
FIG. 6 is an image of a microstructure of a weld nugget comprising a composition that is a mixture of a 7000 series aluminum alloy workpiece and a 6000 series aluminum alloy intermediate material.
Figure 7:
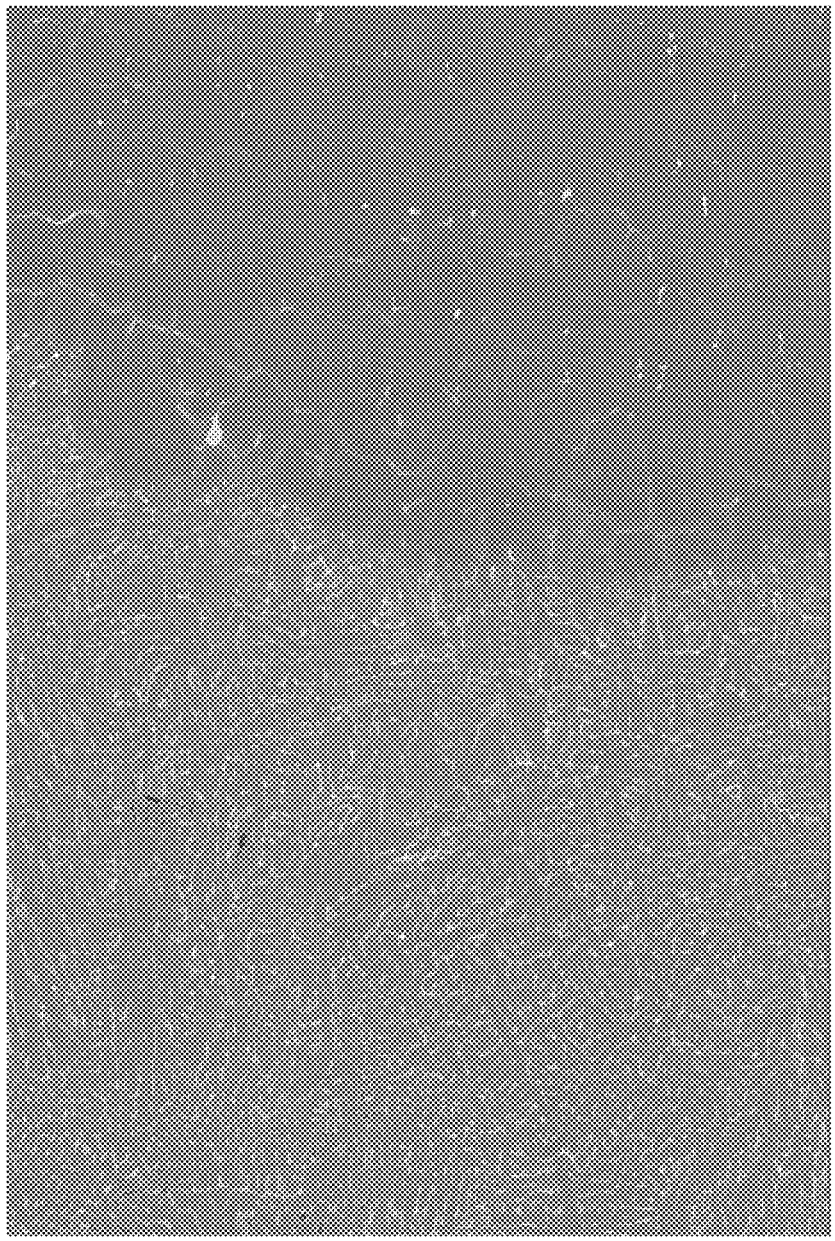
FIG. 7 is an image of a microstructure of the weld nugget of FIG. 6 at a transition region between the weld nugget and the 6000 series aluminum alloy intermediate material.

FIG. 6 shows a microstructure of an exemplary weld nugget comprising a composition that is a mixture of a 7000 series aluminum alloy workpiece and a 6000 series aluminum alloy intermediate material. FIG. 7 shows a microstructure of the weld nugget of FIG. 6 at a transition region between the weld nugget and the 6000 series aluminum alloy intermediate material.

Figure 8:
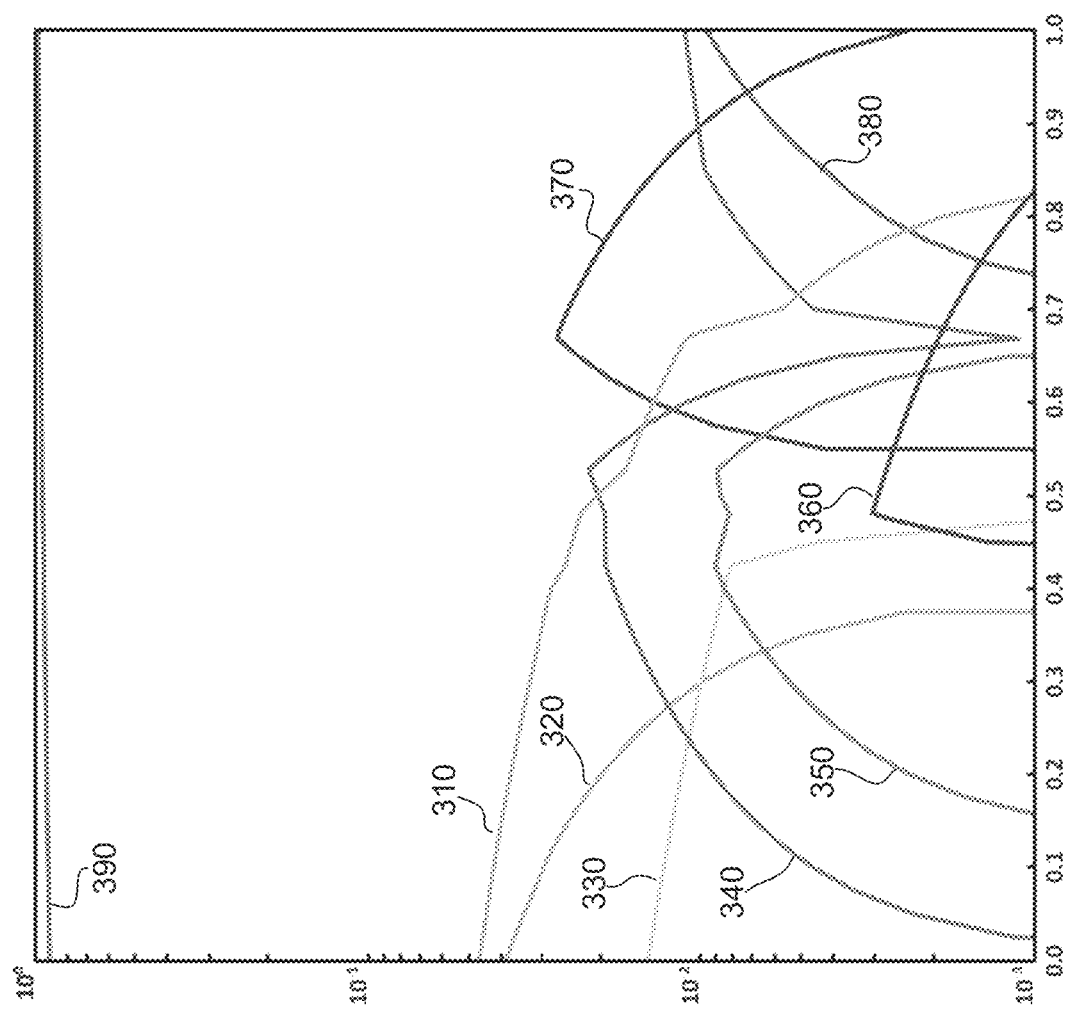
FIG. 8 presents a graph representing an equilibrium simulation for resistance welding of a pair of 7075 aluminum alloy workpieces with a 6022 aluminum alloy intermediate material therebetween.

FIG. 8 presents a graph representing an equilibrium simulation for resistance welding of a pair of workpieces formed of a 7075 aluminum alloy with an intermediate material therebetween formed of a 6022 aluminum alloy. The graph represents phases and volume fractions (y-axis) thereof formed during solidification of a weld pool formed from the workpieces and the intermediate material (temperature of 25° C.) as a function of mass fractions of the intermediate material (x-axis) within the weld pool. The shown phases include C14 laves-phase ($MgZn_2$) 310, T-phase ($Al_{20}Cu_2Mn_3$) 320, $Al_{13}Mg_3$TM2 330 (e.g., TM2 may include $Cr_2$), $Mg_2Si$ 340, $Al_2Cu$ 350, $Al_{13}Cr_4Si_4$ 360, Q-AlCuMgSi 370, Diamond 380, and FCC 390. As shown, inclusion of the intermediate material reduces phases comprising, for example, C14 laves-phase ($MgZn_2$) 310, T-phase ($Al_{20}Cu_2Mn_3$) 320, and $Al_{18}Mg_3$TM2 330 which can reduce the cross-tension strength in weld nuggets.

As a reference example, a weld pool having a composition that is a fifty percent mixture by mass of the 7075 aluminum alloy workpieces and the 6022 intermediate material was determined to have an amount of precipitate rich phases drop from 9.96 percent volume fraction to 5.24 percent volume fraction, representing a 47.44 percent reduction, that is, the addition on the intermediate material to the workpiece stack-up resulted in a weld nugget having 47.44 percent less precipitate rich phases than the weld nugget otherwise would have had if formed without the intermediate material.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the disclosure in any way. Rather, the foregoing detailed description will provide those skilled in the art with a convenient road map for implementing the exemplary embodiment or exemplary embodiments. It should be understood that various changes can be made in the function and arrangement of elements without departing from the scope of the disclosure as set forth in the appended claims and the legal equivalents thereof.

What is claimed is:

1. A method for resistance welding, the method comprising:
    providing a workpiece stack-up including a first workpiece having a first faying surface, a second workpiece having a second faying surface, and an intermediate material located between and in contact with the first faying surface and the second faying surface,
    wherein the first workpiece and the second workpiece are each formed of 7075 series aluminum alloy,
    wherein the intermediate material is formed of a second alloy having a composition comprising:
        at least about 97.0 wt. % aluminum;
        equal to or less than 0.25 wt. % zinc;
        between about 0.45 and 0.7 wt. % magnesium;
        between about 0.8 and 1.5 wt. % silicon; and
        between about 0.01 and 0.11 wt. % copper,
    wherein the first workpiece and the second workpiece each include a higher concentration by weight percent than the second alloy of at least one alloying element chosen from the group consisting of zinc, magnesium, and copper;
    bringing a first welding electrode into contact with the first workpiece and bringing a second welding electrode into contact with the second workpiece;
    performing resistance welding including passing an electrical current between the first welding electrode and the second welding electrode to form a molten weld pool within the first workpiece, the second workpiece, and the intermediate material; and
    cooling the molten weld pool into a weld nugget that forms all or part of a weld joint between the first workpiece and the second workpiece, wherein the weld nugget has a composition that is a mixture of compositions of the first workpiece, the second workpiece, and the intermediate material.

2. The method of claim 1, wherein the concentration of the at least one alloying element in the second alloy is at least 50 percent lower than the concentrations of the at least one alloying element in the first workpiece and the second workpiece.

3. The method of claim 1, wherein the weld nugget has a volume fraction of precipitate rich phases that is lower than a volume fraction of a comparative weld nugget that has a composition that is a mixture of only the first workpiece and the second workpiece.

4. The method of claim 1, wherein the weld nugget has a volume fraction of precipitate rich phases of less than about 20 vol. %.

5. The method of claim 1, wherein the intermediate material has a melting temperature that is equal to or less than melting temperatures of the first workpiece and the second workpiece.

6. The method of claim 1, the intermediate material has a melting temperature of 600° C. or less.

7. The method of claim 1, wherein the intermediate material is a sheet or shim that is physically separate from, and in contact with, the first workpiece and the second workpiece prior to passing an electrical current between the first welding electrode and the second welding electrode.

8. The method of claim 1, wherein the intermediate material is a layer on the first workpiece or on the second workpiece deposited with a thermal spray process, an additive manufacturing process, or an arc braze process.

9. A resistance-welded metal assembly comprising:
a first workpiece formed of a 7075 series aluminum alloy;
a second workpiece formed of the 7075 series aluminum alloy; and
a weld nugget that forms all or part of a weld joint between the first workpiece and the second workpiece;
wherein the weld nugget has a composition that is a mixture of compositions of the first workpiece, the second workpiece, and an intermediate material;
wherein the intermediate material is formed of a second alloy having a composition comprising:
at least about 97.0 wt. % Al;
equal to or less than 0.25 wt. % Zn;
between about 0.45 and 0.7 wt. % Mg;
between about 0.8 and 1.5 wt. % Si; and
between about 0.01 and 0.11 wt. % Cu,
wherein the first workpiece and the second workpiece each include a higher concentration by weight percent than the second alloy of at least one alloying element chosen from the group consisting of zinc, magnesium, and copper.

10. The resistance-welded metal assembly of claim 9, wherein the concentration of the at least one alloying element in the second alloy is at least 50 percent lower than the concentrations of the at least one alloying element in the first workpiece and the second workpiece.

11. A vehicle comprising:
a resistance-welded metal assembly comprising:
a first workpiece formed of a 7075 series aluminum alloy;
a second workpiece formed of the 7075 series aluminum alloy; and
a weld nugget that forms all or part of a weld joint between the first workpiece and the second workpiece;
wherein the weld nugget has a composition that is a mixture of compositions of the first workpiece, the second workpiece, and an intermediate material;
wherein the intermediate material is formed of a second alloy having a composition comprising:
at least about 97.0 wt. % aluminum;
equal to or less than 0.25 wt. % zinc;
between about 0.45 and 0.7 wt. % magnesium;
between about 0.8 and 1.5 wt. % silicon; and
between about 0.01 and 0.11 wt. % copper,
wherein the first workpiece and the second workpiece each include a higher concentration by weight percent than the second alloy of at least one alloying element chosen from the group consisting of zinc, magnesium, and copper.

12. The vehicle of claim 11, wherein the concentration of the at least one alloying element in the second alloy is at least 50 percent lower than concentrations of the at least one alloying element in the first workpiece and the second workpiece.

13. The vehicle of claim 11, wherein the resistance-welded metal assembly is a structural component of the vehicle.

* * * * *